US010123257B2

(12) United States Patent
Duo et al.

(10) Patent No.: US 10,123,257 B2
(45) Date of Patent: Nov. 6, 2018

(54) WIRELESS EXTENDER SECURE DISCOVERY AND PROVISIONING

(71) Applicant: SonicWALL US Holdings Inc., Santa Clara, CA (US)

(72) Inventors: Zhuangzhi Duo, Fremont, CA (US); Zhong Chen, Fremont, CA (US); John Gmuender, Sunnyvale, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

(21) Appl. No.: 15/600,038

(22) Filed: May 19, 2017

(65) Prior Publication Data

US 2017/0257818 A1 Sep. 7, 2017

Related U.S. Application Data

(63) Continuation of application No. 14/530,668, filed on Oct. 31, 2014, now Pat. No. 9,668,200, which is a
(Continued)

(51) Int. Cl.
*H04W 48/10* (2009.01)
*H04W 48/16* (2009.01)
(Continued)

(52) U.S. Cl.
CPC .......... *H04W 48/10* (2013.01); *H04W 24/08* (2013.01); *H04W 36/30* (2013.01); *H04W 48/16* (2013.01); *H04W 48/20* (2013.01); *H04L 63/061* (2013.01); *H04W 12/04* (2013.01); *H04W 24/02* (2013.01); *H04W 84/12* (2013.01); *H04W 92/20* (2013.01)

(58) Field of Classification Search
CPC ..... H04W 48/10; H04W 24/08; H04W 36/30; H04W 48/16; H04W 48/20; H04W 12/04; H04W 24/02; H04W 84/12; H04W 92/20
See application file for complete search history.

(56) References Cited

U.S. PATENT DOCUMENTS 6,701,361 B1 3/2004 Meier
6,940,843 B2 9/2005 Goodall et al.
(Continued)

OTHER PUBLICATIONS

IEEE P802.11n/D2.00, Draft Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications: Amendment <number>: Enhancements for Higher Throughput, Feb. 2007, 498 pages.
(Continued)

*Primary Examiner* — Duc C Ho
(74) *Attorney, Agent, or Firm* — Polsinelli LLP

(57) ABSTRACT

According to embodiments of the invention, a first wireless access point discovers a second wireless access point, the first wireless access point tunes its radio and privacy settings, without user input, based upon parameters automatically exchanged in response to the discovery of the second wireless access point, and a secure direct wireless connection is established between the first and second wireless access points using the radio and privacy settings. Adding the first wireless to an existing mesh network includes a determination of the best available direct wireless connection.

19 Claims, 7 Drawing Sheets

Related U.S. Application Data continuation of application No. 14/089,593, filed on Nov. 25, 2013, now Pat. No. 8,908,706, which is a continuation of application No. 13/478,003, filed on May 22, 2012, now Pat. No. 8,594,109, which is a continuation of application No. 12/724,363, filed on Mar. 15, 2010, now Pat. No. 8,189,608.

(60) Provisional application No. 61/291,790, filed on Dec. 31, 2009.

(51) Int. Cl.
*H04W 36/30* (2009.01)
*H04W 48/20* (2009.01)
*H04W 24/08* (2009.01)
*H04W 12/04* (2009.01)
*H04W 24/02* (2009.01)
*H04W 84/12* (2009.01)
*H04W 92/20* (2009.01)
*H04L 29/06* (2006.01)

(56) References Cited

U.S. PATENT DOCUMENTS

| | | | |
|---|---|---|---|
| 7,362,731 B2 | 4/2008 | Vinayakray-Jani | |
| 8,189,608 B2 | 5/2012 | Duo | |
| 8,270,382 B2 | 9/2012 | Cam-Winget et al. | |
| 8,363,617 B2 | 1/2013 | Meyer | |
| 8,594,109 B2 | 11/2013 | Duo | |
| 8,908,706 B2 | 12/2014 | Duo | |
| 9,668,200 B2 | 5/2017 | Duo | |
| 2004/0236939 A1* | 11/2004 | Watanabe | H04L 63/0428 713/150 |
| 2004/0246922 A1 | 12/2004 | Ruan et al. | |
| 2005/0143065 A1 | 6/2005 | Pathan et al. | |
| 2005/0220054 A1* | 10/2005 | Meier | G06Q 20/3674 370/331 |
| 2006/0039321 A1* | 2/2006 | Thawani | H04L 63/0428 370/328 |
| 2006/0039341 A1* | 2/2006 | Ptasinski | H04L 63/12 370/338 |
| 2006/0078123 A1* | 4/2006 | Bichot | H04W 48/18 380/270 |
| 2006/0239281 A1 | 10/2006 | Sethi et al. | |
| 2007/0050615 A1* | 3/2007 | Xu | H04L 63/0428 713/151 |
| 2007/0091864 A1 | 4/2007 | Honjo et al. | |
| 2007/0135122 A1 | 6/2007 | Dillon et al. | |
| 2007/0242645 A1 | 10/2007 | Stephenson et al. | |
| 2008/0080387 A1 | 4/2008 | Wang et al. | |
| 2008/0225804 A1 | 9/2008 | Thubert et al. | |
| 2008/0266160 A1 | 10/2008 | Goodall et al. | |
| 2010/0020746 A1* | 1/2010 | Zaks | G06Q 30/02 370/328 |
| 2010/0309815 A1 | 12/2010 | Yepez et al. | |
| 2011/0090896 A1 | 4/2011 | Bradley | |
| 2012/0230491 A1 | 9/2012 | Duo | |
| 2014/0086215 A1 | 3/2014 | Duo | |
| 2015/0055501 A1 | 2/2015 | Duo | |

OTHER PUBLICATIONS

IEEE Std 802.11i—2004, IEEE Standard for Information Technology—Telecommunications and Information Exchange Between Systems—Local and Metropolitan Area Networks—Specific Systems—Local and Metropolitan Area Networks—Specific Requirements, Part 11: Wireless LAN Medium Access Control (MAC) and Physical Layer (PHY) specifications, Amendment 6: Medium Access Control (MAC) Security Enhancements, 2004, 190 pages.

IEEE Std 802.11g—2003, IEEE Standard for Information Technology—Telecommunications and Information Exchange Between Systems—Local and Metropolitan Area Networks—Specific Systems—Local and Metropolitan Area Networks—Specific Requirements, Part 11: Wireless LAN Medium Access Control (MAC) and Physical Layer (PHY) specifications, Amendment 4: Further Higher Data Rate Extension in the 2.4 GHz Band, Jun. 27, 2003, 78 pages.

IEEE Std 802.11b—1999(R2003), Supplement to IEEE Standard for Information Technology—Telecommunications and Information Exchange Between Systems—Local and Metropolitan Area Networks—Specific Systems—Local and Metropolitan Area Networks—Specific Requirements, Part 11: Wireless LAN Medium Access Control (MAC) and Physical Layer (PHY) specifications: Higher-Speed Physical Layer Extension in the 2.4 GHz Band, Approved Sep. 16, 1999, Reaffirmation Jun. 12, 2003, 96 pages.

IEEE Std 802.11a—1999(R2003), Supplement to IEEE Standard for Information Technology—Telecommunications and Information Exchange Between Systems—Local and Metropolitan Area Networks—Specific Systems—Local and Metropolitan Area Networks—Specific Requirements, Part 11: Wireless LAN Medium Access Control (MAC) and Physical Layer (PHY) specifications: Higher-Speed Physical Layer in the 5 GHz Band, Jun. 12, 2003, 91 pages.

U.S. Appl. No. 13/478,003; Office Action dated Mar. 12, 2013.
U.S. Appl. No. 14/530,668; Final Office Action dated Nov. 4, 2016.
U.S. Appl. No. 14/530,668; Office Action dated May 20, 2016.

* cited by examiner

WIRELESS EXTENDER SECURE DISCOVERY AND PROVISIONING

CROSS-REFERENCE TO RELATED APPLICATIONS

The present application is a continuation and claims the priority benefit of U.S. patent application Ser. No. 14/530,668 filed Oct. 31, 2014, now U.S. Pat. No. 9,668,200, which is a continuation and claims the priority benefit of U.S. patent application Ser. No. 14/089,593 filed on Nov. 25, 2013, now U.S. Pat. No. 8,908,706, which is a continuation and claims the priority benefit of U.S. patent application Ser. No. 13/478,003 filed May 22, 2012, now U.S. Pat. No. 8,594,109, which is a continuation and claims the priority benefit of U.S. patent application Ser. No. 12/724,363 filed Mar. 15, 2010, now U.S. Pat. No. 8,189,608, which claims the priority benefit of U.S. provisional application 61/291,790 filed on Dec. 31, 2009, the disclosures of which are incorporated herein by reference.

BACKGROUND OF THE INVENTION

Field of the Invention

Embodiments of the present invention relate generally to wireless networks. More particularly, these embodiments relate to products, systems, and methods for automatic discovery and provisioning of a wireless connection between access points.

Description of the Related Art

A local area network ("LAN") typically employs one of two connection arrangements: full mesh topology or partial mesh topology. In the full mesh topology, each mesh node (e.g., an access point or station) is connected directly to each of the others. In the partial mesh topology, one or more mesh nodes may be connected to all the others, but some of the mesh nodes are connected only to some of the other mesh nodes (e.g., those other mesh nodes with which they exchange the most data).

In a wireless LAN ("WLAN"), one or more of the connections between the mesh nodes is facilitated wirelessly. In order to extend the range of a WLAN, system administrators (or users) often connect a new wireless access point (wireless extender) to the network by connecting the wireless extender to another wireless access point (wireless root access point). There may be, however, multiple wireless root access points to which the wireless extender may wirelessly connect. Existing networks may provide no means by which to determine which wireless root access point in a network would provide the best connection for the wireless extender. Furthermore, the need for a user to input radio settings (e.g., channel, service set identifier, etc.) and privacy settings (e.g., authentication data, cipher data, key data, etc.) into the wireless extender increases the complexity and difficulty in extending the WLAN.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
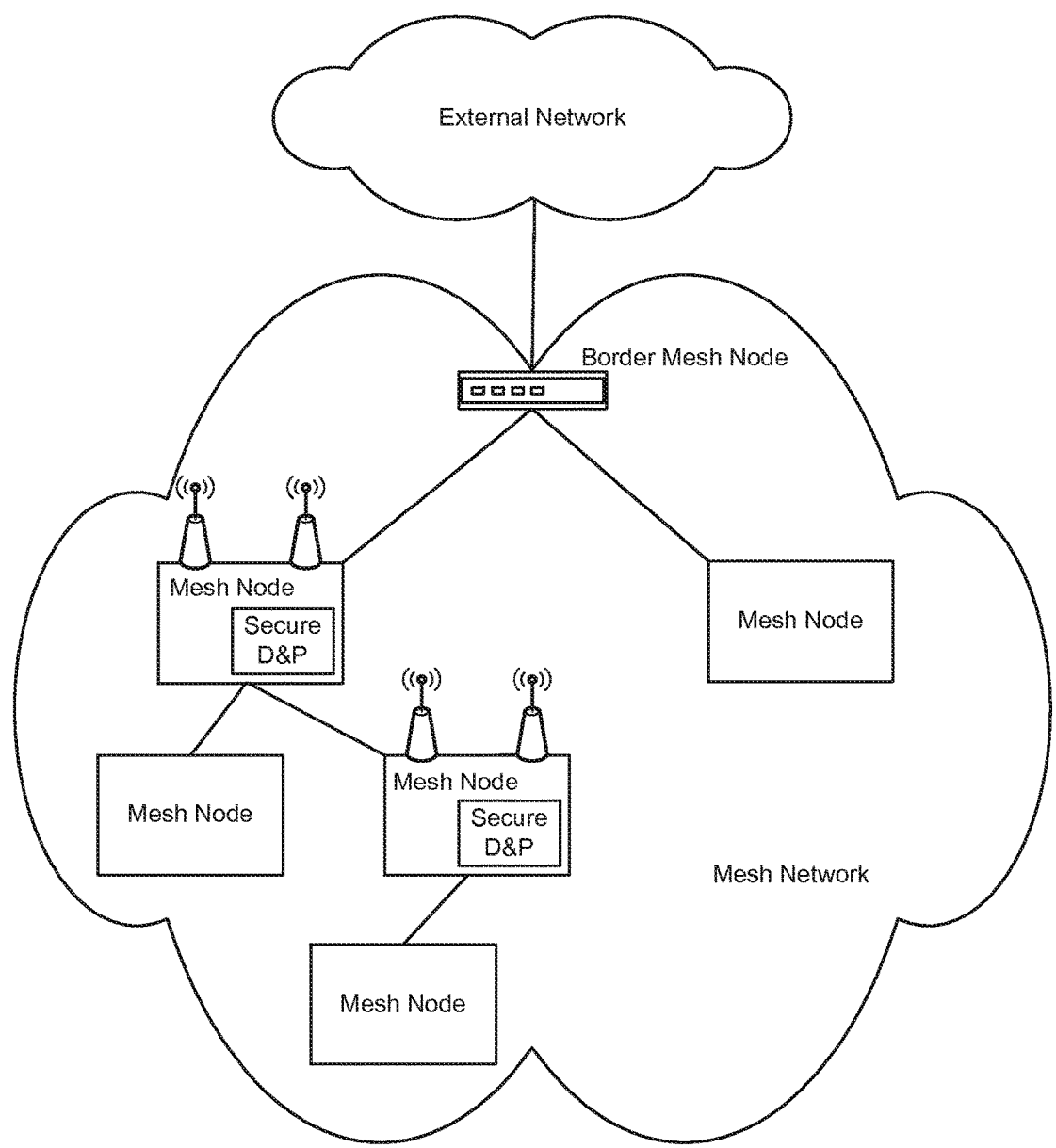
FIG. 1 illustrates an exemplary mesh network in which embodiments of the Wireless Extender Secure Discovery and Provisioning may be implemented.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. "Directly connected" is used to indicate the establishment of communication between two or more elements that are coupled with each other without an intervening node (e.g., two wireless access points in wireless communication without an intervening wireless access point).

According to an embodiment of the invention a first wireless access point (wireless extender) discovers a second wireless access point (wireless root access point); automatically, in response to the discovery of the second wireless access point, the first and second wireless access points exchange parameters; the first wireless access point tunes its radio and privacy settings, without user input, based upon the exchanged parameters; and a secure direct wireless connection is established between the first and second wireless access points using the radio and privacy settings. For one embodiment, wireless discovery and provisioning includes a determination of the best available wireless connection (e.g., signal strength, hop count, number of wireless stations already in the BSS of wireless root access point, etc.) to one of a number of wireless access points available for direct wireless connection. For one embodiment, the first wireless access point manages a basic service set and relays traffic from the basic service set to the second wireless access point.

As used herein, a basic service set ("BSS") refers to a wireless access point and all stations associated with that access point. "Station" or "wireless station" is used herein to refer to a device that has the capability to connect for wireless and/or wired connection to the network via a wireless access point. For example, a station may be a laptop, a desktop computer, personal digital assistant ("PDA"), a phone, etc. As used herein, a mesh node refers to either a wireless access point or a station connected to a full or partial mesh network. "Wireless root access point" is used herein to refer to a wireless access point to which a wireless extender may establish a direct wireless connection (i.e., a wireless extender joins the BSS of the wireless root access point, and thus the wireless extender and wireless root access point are respectively a child mesh node and a parent mesh node). While the topmost node in a tree data structure is commonly referred to as the "root" node (i.e., it will not have a parent node), the use of the term "root" in "wireless root access point" herein is not so limited. There may be multiple wireless root access points in a network, a wireless root access point does not need to be the topmost node of the WLAN (e.g., a border mesh node as described below), and a wireless root access point may have a parent mesh node.

FIG. 1 illustrates an exemplary partial mesh network in which embodiments of the Wireless Extender Secure Discovery and Provisioning are implemented. Embodiments discussed herein organize mesh nodes as a tree hierarchy (alternate embodiments may organize mesh nodes differently—e.g., graph, star, etc.).

For one embodiment, only one active border mesh node is present in this mesh network to connect all mesh nodes to an external environment (e.g., another LAN or WAN). This model simplifies the relationship among all mesh nodes in at least two aspects. First, routing will be very straightforward, only the route between child mesh node and parent mesh node will be allowed, and all outgoing traffic will be eventually forwarded to the active border mesh node for the data exchange with external networks. Second, only one active border mesh node is delegated to handle traffic exchange with the outer environment. As a result, gateway functionality such as network address translation ("NAT") and bandwidth management can be easily deployed in the active border mesh node to control traffic. Additionally, for one embodiment, one or more other mesh nodes are appointed as standby border mesh nodes to switch over in case the active border mesh node loses power or does not function properly. In alternate embodiments, more than one active border mesh node is present.

Each leaf mesh node has at least one direct connection to communicate with its parent mesh node. FIG. 1 illustrates a single pair of wireless access points in direct connection and implementing an embodiment of secure discovery and provisioning ("Secure D&P"). Secure D&P, however, may be implemented in one or more pairs of child and parent mesh nodes.

In a mesh network, in addition to having the capability of direct wired connections, a wireless access point may perform dual roles. First, the access point may manage a BSS as a regular wireless access point. If the wireless access point has the capability of establishing a direct wireless connection with a wireless extender such that the wireless access point's BSS includes the wireless extender (i.e., another wireless access point), the wireless access point managing the BSS acts as a wireless root access point. Second, the access point may act as a wireless extender and relay traffic (e.g., from its BSS or from another wireless access point) to a parent mesh node (e.g, another wireless root access point). As a result of these dual roles, multiple wireless access points are able to be wirelessly chained to extend the reach of a WLAN. Discovering and provisioning a secure direct connection between wireless access points in such a wireless chain will be addressed herein.

Figure 2:
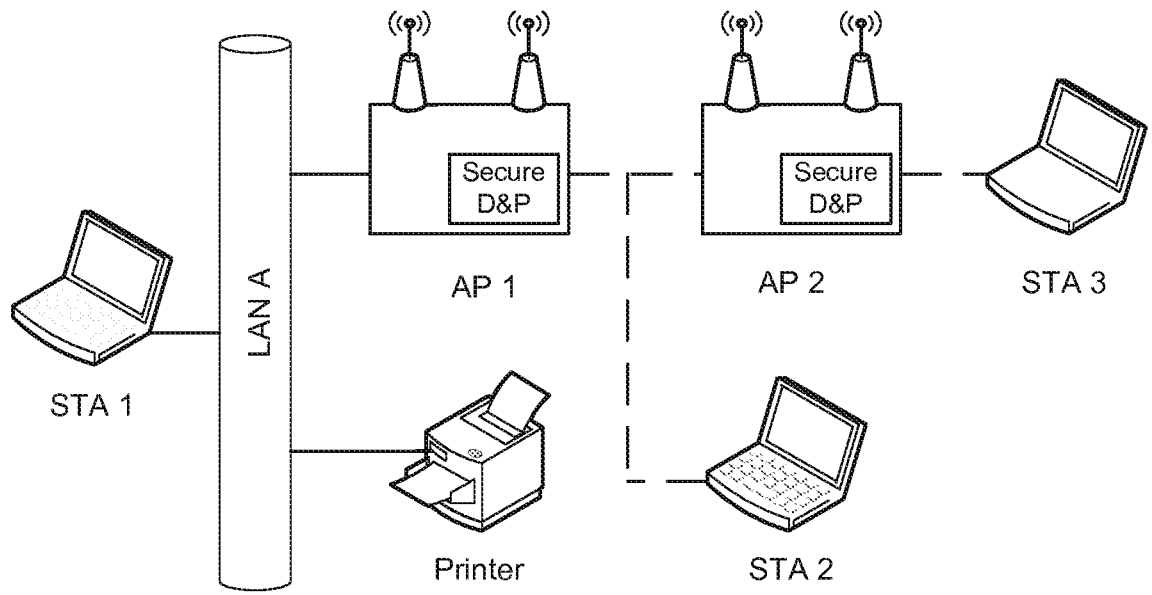
FIG. 2 illustrates an exemplary mesh network in which a wireless extender may perform the dual roles of managing a basic service set and relaying traffic to a wireless root access point.

FIG. 2 illustrates the dual actor mode of a wireless access point. Wireless access point AP1 is acting as the parent mesh node of wireless access point AP2, and thus they are respectively a root wireless access point and a wireless extender. Wireless station STA3 can either connect to wireless access point AP1 or wireless access point AP2 to join the network. For one embodiment, the determination of which wireless access point's BSS to join depends on the respective signal strength and/or other parameters (e.g., hop count, number of wireless stations already in the BSS, etc.) of their direct wireless connections. If wireless station STA3 associates with wireless access point AP1 (not shown), wireless access point AP1 acts as a regular wireless access point to relay traffic to the external network LAN A. If wireless station STA3 associates with wireless access point AP2, as illustrated, wireless access point AP2 will relay data between wireless access point AP2 and wireless access point AP1. Therefore, from the point view of wireless station STA3, wireless access point AP1 has extended its radio coverage via relaying traffic from wireless access point AP2. In this scenario, wireless access point AP1 is referred to as a wireless root access point and wireless access point AP2 is referred to as a wireless extender. Thus, as used herein, a wireless extender refers to a wireless access point that, in this dual actor mode, is a member of the BSS of a wireless root access point and relays wireless traffic between its own BSS and the wireless root access point.

For example, wireless access point AP1 and wireless access point AP2 both manage respective BSS's. In the illustrated example wireless station STA2 and wireless access point AP2 are a part of wireless access point AP1's BSS, and wireless station STA 3 is a part of wireless access point AP2's BSS. Each wireless access point may have more or less wireless stations connected to its BSS and, as described below, wireless stations are able to roam between BSS's.

Embodiments of the wireless extender secure discovery and provisioning disclosed herein are implemented in the mesh nodes as illustrated in FIGS. 1 and 2. The wireless extender secure discovery and provisioning is responsible for discovery of a wireless root access point and self-tuning the wireless extender to establish a secure wireless connection with the wireless root access point. Additionally, a management channel can also be built on this wireless link to support administration, monitoring, and other management operations. For one embodiment, the discovery and provisioning is implemented in the IEEE 802.11 Media Access Control ("MAC") layer and utilizes the IEEE 802.11 Management Frame to convey discovery and simple provisioning handshake information between the wireless extender and its wireless root access point (as described later herein). As used herein, IEEE 802.11 refers to all applicable protocols within the IEEE 802.11 family—e.g., IEEE 802.11a, 802.11b, 802.11g, 802.11i, 802.11n, etc.

For one embodiment, a network implements only one level of repeating. In other words, in a network that contains multiple wireless root access points Ri (i=1 . . . M) and multiple wireless extenders Xj (j=1 . . . N), any wireless extender Xj joins the BSS of a wireless root access point Ri instead of any other wireless extenders. Utilizing a single level repeating relationship, the R-X model, when more levels of repeating deployment is required, a user can easily replicate the functionality of this R-X model to form an R-X chain.

In an exemplary network deployment, radio and privacy settings include, for example, a service set identifier ("SSID"), authentication data, cipher data, key data, etc. Provisioning, as used herein, includes exchanging parameters over a direct secure channel and setting Xj's radio and privacy settings in order to establish a secure direct wireless connection between Ri and Xj based on these settings. In order to secure the channel between Xj and Ri and prevent versatile attacks, such as eavesdropping, man-in-the-middle, impersonating, replay, database reading, and many other known security holes, an embodiment of secure discovery and provisioning utilizes public-private key pairs to perform mutual authentication and to encrypt the communication channel using strong dynamic session key. Both parties have a public-private key pair <E, D>. Public key E will be used for encryption and private key D will be used for decryption, respectively. For one embodiment, for a given public-private key pair, it is relatively difficult to decrypt data encrypted with E without having D. Once the Xj tunes itself to Ri's transmitted radio and privacy settings, a secure direct wireless connection is established and a wireless station can benefit from smooth roaming among BSS's of Xj and Ri without changing the wireless station's radio and privacy settings.

Figure 3:
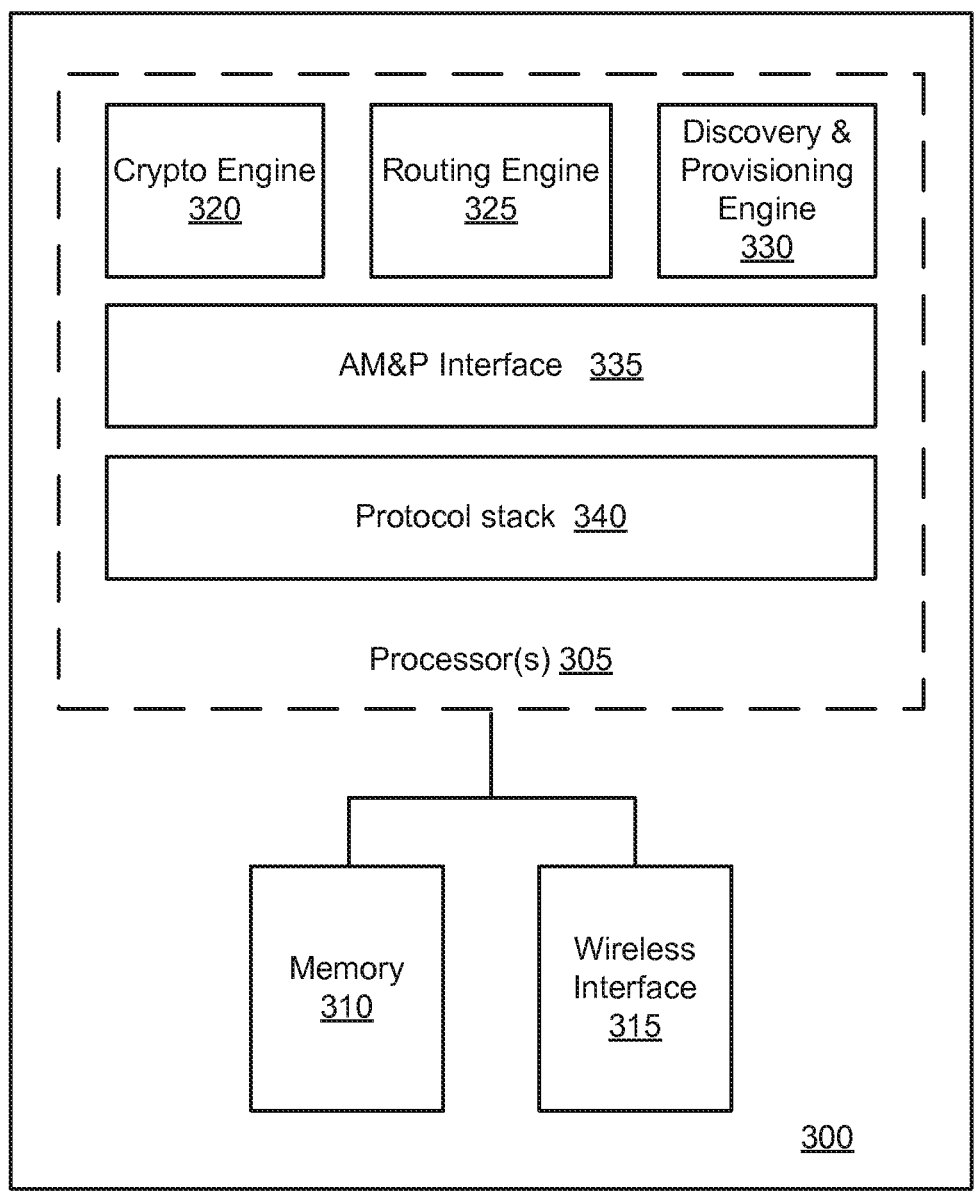
FIG. 3 illustrates an exemplary wireless access point in which an embodiment of secure discovery and provisioning is implemented.

FIG. 3 illustrates an exemplary wireless access point 300 in which an embodiment of secure discovery and provisioning is implemented. Wireless access point 300 is a dual actor, as described above, and can serve as either (or both) a wireless extender and wireless root access point (e.g., by having the capability of managing a BSS that includes another wireless extender). While wireless access point 300 may include additional/or different items, in the illustrated embodiment of wireless access point 300 includes one or more processors 305, a memory 310, and a wireless interface 315, all coupled to one or more buses. Processor(s) 305 may be implemented in a variety of ways, including a single processor, multiple processors, a single processor including multiple functional processor cores (e.g., a multi-core processor), or a combination thereof. For one embodiment, memory 310 includes a machine-readable storage medium on which is stored one or more sets of instructions (e.g., software) embodying one or more methodologies or functions of the secure discovery and provisioning described herein, which is implemented by the processor(s) 305 executing the instructions stored in the memory 310.

The processor 305 is illustrated as including multiple subcomponents, including the crypto engine 320, routing engine 325, discovery and provisioning engine 330, and administration, management, and provisioning ("AM&P") interface 335, each of which will be described further below. Additionally, the processor 305 is further illustrated to include a protocol stack 340, which interacts with the AM&P interface 335. Each component has been illustrated as a separate functional block for ease of explanation of functionality of embodiments of the invention and not intended to be limiting—i.e., components could be combined or further separated, implemented in hardware and/or software, etc (e.g., as indicated above, one or more components may be implemented as instructions stored in memory 310 and executed by the processor(s) 305). Alternatively, one or more of the components could be implemented separate from the processor(s) 305. Also, additional components would normally be present but are not illustrated so as not to obscure one of ordinary skill in the art from understanding.

The crypto engine 320 provides random number generation, hashing, encryption, decryption, and other cryptography related functions. The routing engine 325 determines the best available wireless root access point when wireless access point 300 is acting as a wireless extender. The discovery and provisioning engine 330 manages the discovery of potential wireless root access points and provisioning of the wireless extender to establish a secure direct wireless connection with a wireless root access point. The AM&P interface 335 provides the interface to configure and monitor the protocol stack 340 (e.g., application programming interface (API) utilizing input/output control ("IOCTL") commands to set parameters in an IEEE 802.11 management stack). The functionalities of crypto engine 320, routing engine 325, and discovery and provisioning engine 330, as they relate to secure discovery and provisioning, will be further described below.

Figure 4:
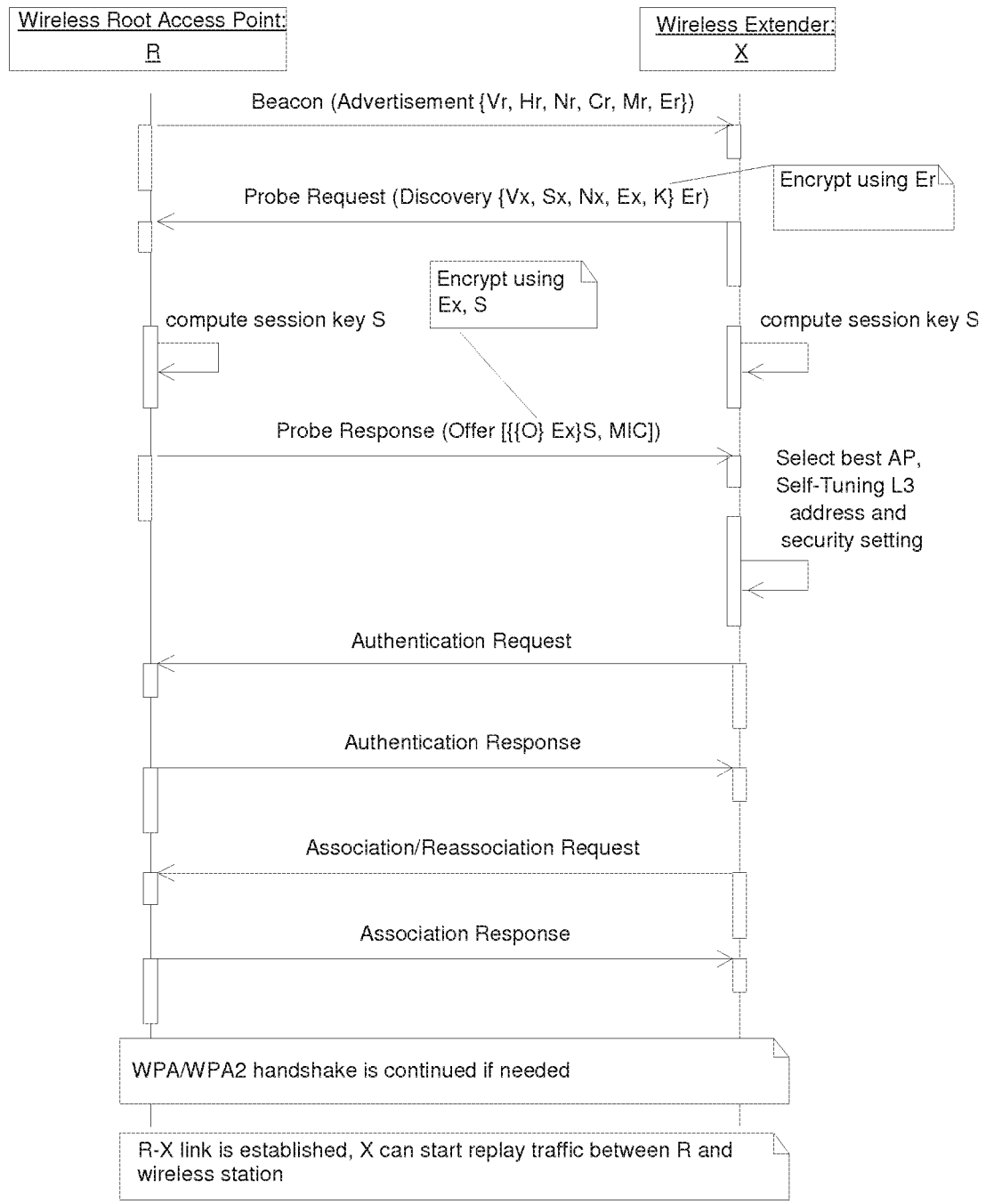
FIG. 4 illustrates an exemplary exchange between a wireless extender and a wireless root access point according to an embodiment of secure discovery and provisioning.
Figure 5:
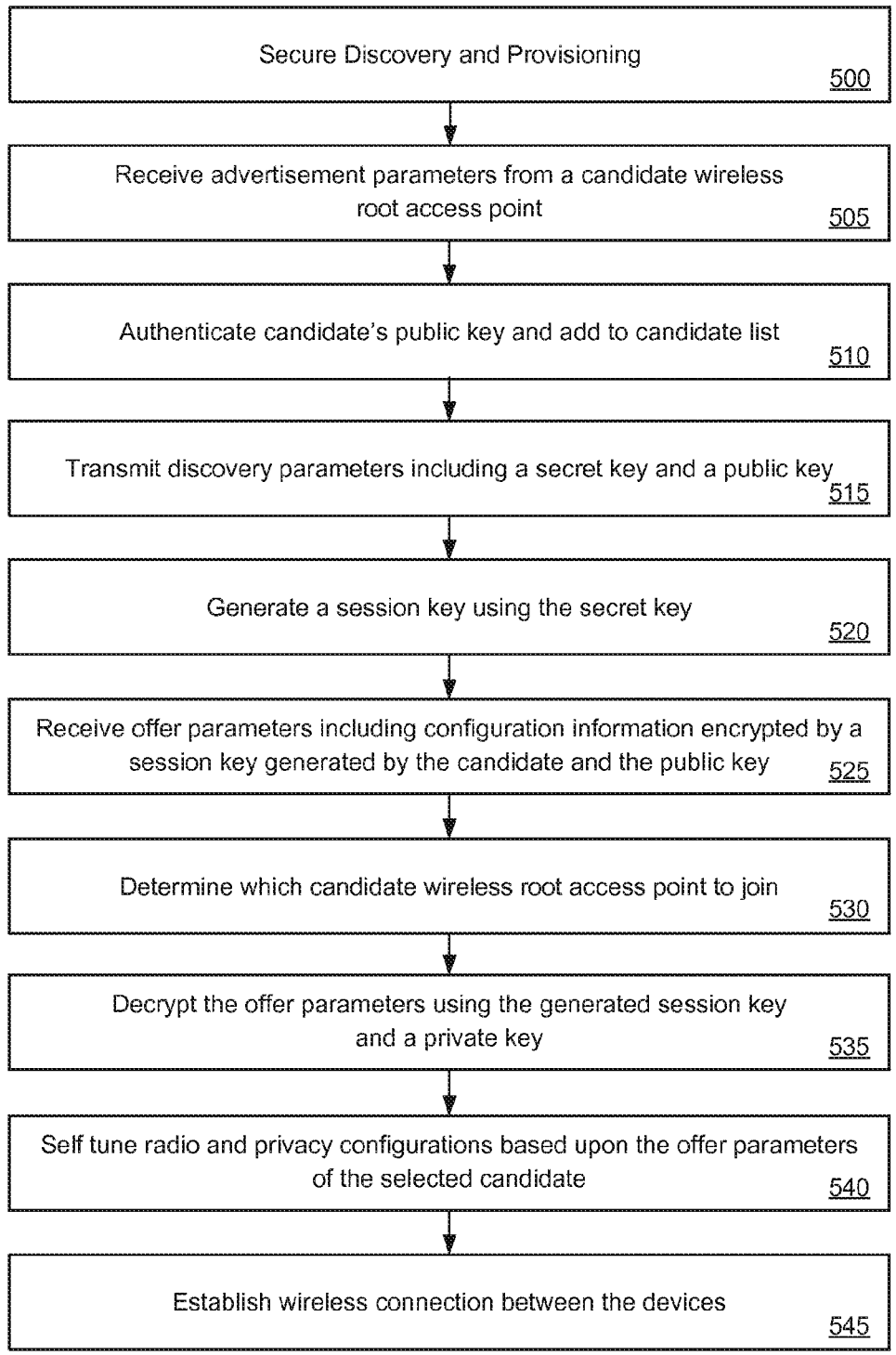
FIG. 5 is a flow chart illustrating an exemplary exchange between a wireless extender and a wireless root access point according to an embodiment of secure discovery and provisioning.

FIGS. 4 and 5 illustrate an exemplary exchange between a wireless extender and a wireless root access point and corresponding method 500 according to an embodiment of secure discovery and provisioning. While FIGS. 4 and 5 include a particular series of steps, alternate embodiments of the invention may implement fewer or more steps and/or perform one or more steps in a different order.

Wireless root access point R broadcasts beacon frames including an advertisement. Exemplary advertisement parameters include a protocol, software, and/or hardware version Vr for the wireless root access point, a hop count Hr, nonce Nr, client number (i.e, number of wireless stations already in the BSS) Cr, mean received signal strength indication ("RSSI") value Mr, and the wireless root access point's public key Er.

At block 505, a wireless extender X seeking to join a network will receive the broadcasted beacon. At block 510, upon receipt of the beacon frame from R, if the discovery and provisioning engine 330 in X can successfully locate the advertisement, X will process the advertisement parameters. For example, X automatically performs, without user input, one or more of the following: verifying authenticity of public key Er and checking if version Vr in the advertisement is compatible with its own. For one embodiment, the crypto engine 320 utilizes a certificate authority installed within the wireless extender (e.g., when manufactured, prior to sale, etc.) or another authentication algorithm installed within the wireless extender to authenticate the public key Er. If the advertisement parameters are successfully processed (e.g., authenticated/compatible), X will assume R is a wireless root access point candidate and keep it in candidate list—e.g., stored in the memory 310.

Upon determination that R is a candidate, the discovery and provisioning engine 330 in X will transmit a probe request including discovery parameters from the wireless extender at block 515. Exemplary discovery parameters include protocol, software, and/or hardware version Vx for the wireless extender, a configuration checksum Sx, nonce Nx, the wireless extender's public key Ex, as well as a secret key K generated for session key computation. For one embodiment, the discovery parameters will be encrypted with public key Er. The generation of Nx and encryption of the discovery parameters are performed by crypto engine 320.

Once R receives the probe request from X, R locates and decrypts the discovery parameters using its private key Dr (e.g., using its own crypto engine 320). Wireless root access point R automatically, without user input, performs its own verification—e.g., verifying the authenticity of public key Ex, determining that version Vx in the discovery parameters is compatible with R's version Vr, and/or determining if checksum Cx is the same as a cached value (e.g., a checksum from a previously connected wireless extender). Similar to X, R may have a certificate authority or other known authentication algorithm installed within R (e.g., when manufactured, prior to sale, etc.) to verify the authenticity of Ex. For one embodiment, if checksum Cx is the same as the cached value, R will determine that X has been previously tuned to connect with R and is attempting to reassociate with R. In the case of reassociation, R sends the original/previously sent probe response management frame back to X. Otherwise, if checksum Cx is not the same as the cached value, R will compute a session key based on the discovery parameters from X (as described with reference to block 520 below).

Both wireless extender X and wireless root access point R compute a session key S based on the same function at block 520—e.g., both wireless access points are programmed, prior to the discovery process (e.g., when manufactured, prior to sale, etc.), to utilize the same function or formula to compute the session key. For one embodiment, each wireless access point's crypto engine 320 computes the session key using the function S=PRF(Nr, Br, Nx, Bx, K). For one embodiment, pseudorandom function PRF is any industrial encryption method, such as Data Encryption Standard ("DES"), Triple DES, Advanced Encryption Standard ("AES"), etc. Br and Bx are SSID's for R and X respectively, which can be collected from the beacon and probe request. K is the secret key generated by X. For one embodiment, K includes a random number and the wireless root access point protocol, software, and/or hardware version version Vr.

After computing the session key S, R transmits a probe response. The payload of the probe response is an offer O, which includes offer parameters for the configuration of radio and privacy settings for X. Alternatively, parameters for the configuration of radio and privacy settings may be included in separate transmissions. For example, radio settings, e.g., the SSID for R, may be included in the beacon while the privacy settings, e.g., authentication data, cipher data, key data, etc., may be included in the probe response.

For one embodiment, the offer O is encrypted with wireless extender X public key Ex and then encrypted with the session key S. For one embodiment, the offer is encrypted only with the session keyS. For one embodiment, a Message Integrity Check ("MIC") is appended to the offer to prevent inadvertent modification to the data. For one embodiment, MIC=HMAC-MD5(O, S). Alternatively, MIC implements another hash function or cryptographic hash function for message authentication. At block 525, X receives the probe response.

If there are multiple candidate wireless root access points, the routing engine 325 in X determines that R is the best of multiple candidates with which to establish a wireless connection at block 530. For one embodiment, X will traverse its candidate list to select the best candidate to join after X receives the probe response from R and other wireless root access points. Alternatively, the determination of which candidate to join is made at an earlier stage—e.g., after receiving the beacon. The determination of the best candidate is based on one or more of the following: peer signal strength Rr/Mr, hop count Hr, or client number Cr. For example, each retransmission (hop) can equate to a reduction in the maximum wireless effective throughput as well as a time delay. Additionally, the number of clients already associated with R provides an indication of the amount of bandwidth currently consumed in R's BSS.

For another embodiment, the determination of the best candidate is based upon signal strength alone (e.g., strongest RSSI value). Alternatively, the following equation provides an exemplary method by which X chooses the best root access point:

$R_i$: RSSI value measured from wireless root access point i
$C_i$: Client number (i.e., number of wireless stations already in the BSS of wireless root access point i)
$H_i$: Hop count of wireless root access point i
$M_i$: Mean RSSI value from wireless root access point i
$P_i$: Weight of Client number associated with wireless root access point i $P_i = C_i / \sum_{j=0}^{n} C_j$ (n is the total number of wireless root access points)

$Q_i$: Weight of Hop Count of wireless root Access Point $Q_i = H_i / \sum_{j=0}^{n} H_j$ (n is the total number of wireless root access points)

$D_i$ and $W_i$: Weight of signal strength of wireless root access point
$D_i = M_i - R_i$
$W_i = 1 + M_i / R_i$ (if $D_i >= O$)
$W_i = 1 + M_i / R_i$ (if $D_i <= O$)
$S_i$: Weight of candidate (selection)
$S_i = D_i * W_i * P_i * Q_i$ Wireless extender X will use the equation above to determine that the wireless root access point R has the largest weight Si (or similar determination) and, therefore, is the best candidate.

Upon selecting R, the crypto engine 320 in X decrypts R's offer parameters using the session key S computed by X at block 535. Additionally, if utilizing multiple layers of encryption (e.g. the offer is encrypted with both Sand Ex), X also decrypts the offer parameters using private key Dx.

Wireless extender X computes MIC, using the same formula as R, to check the integrity of the data sent from wireless root access point R. If the received MIC is verified, X will tune itself using the privacy settings embedded in the offer parameters at block 540. The privacy settings enable X to be a valid wireless client to continue authentication and association/reassociation with R. Additionally, the privacy settings enable wireless stations to roam between the BSS of R and the BSS of X (as well as other wireless access points within the network that share the same privacy settings).

For one embodiment, the rest of the management frames (e.g., according to IEEE 802.11), including Authentication and Association/Reassociation, are kept intact. Once the association request and response are completed, the secure direct wireless connection is established between R and X, and X can begin to relay traffic to Rat block 545. If the privacy settings include Wi-Fi Protected Access ("WPA/WPA2") encryption, the WPA/WPA2 handshake will continue to play until the wireless link is established.

For one embodiment, R will continue to listen to the probe request from X, and once it determines that the configuration checksum Cx does not match the cached value within R, R will send out a probe response with an offer to provision extender X again. This ensures the extender X can continue to synchronize with the radio and privacy settings from R to maintain a valid and secure direct wireless connection with R.

Figure 6:
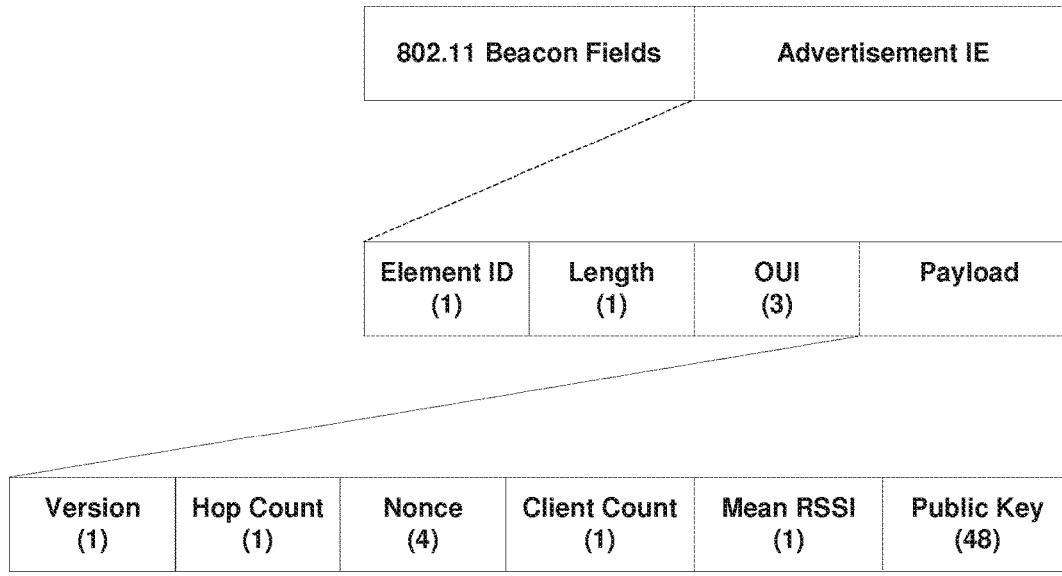
FIG. 6 is an exemplary beacon frame format.
Figure 7:
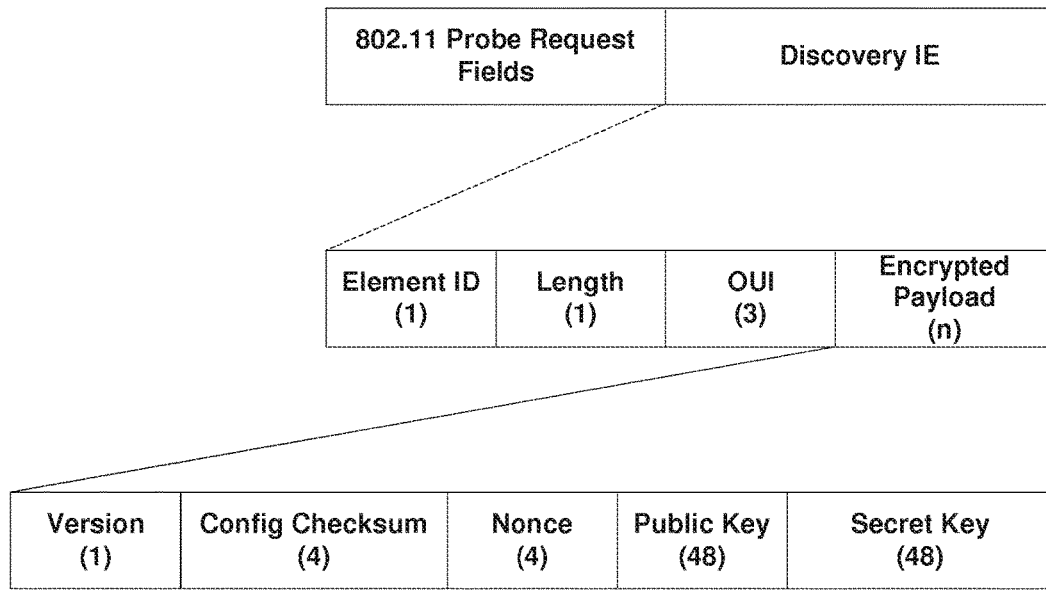
FIG. 7 is an exemplary probe request frame format.
Figure 8:
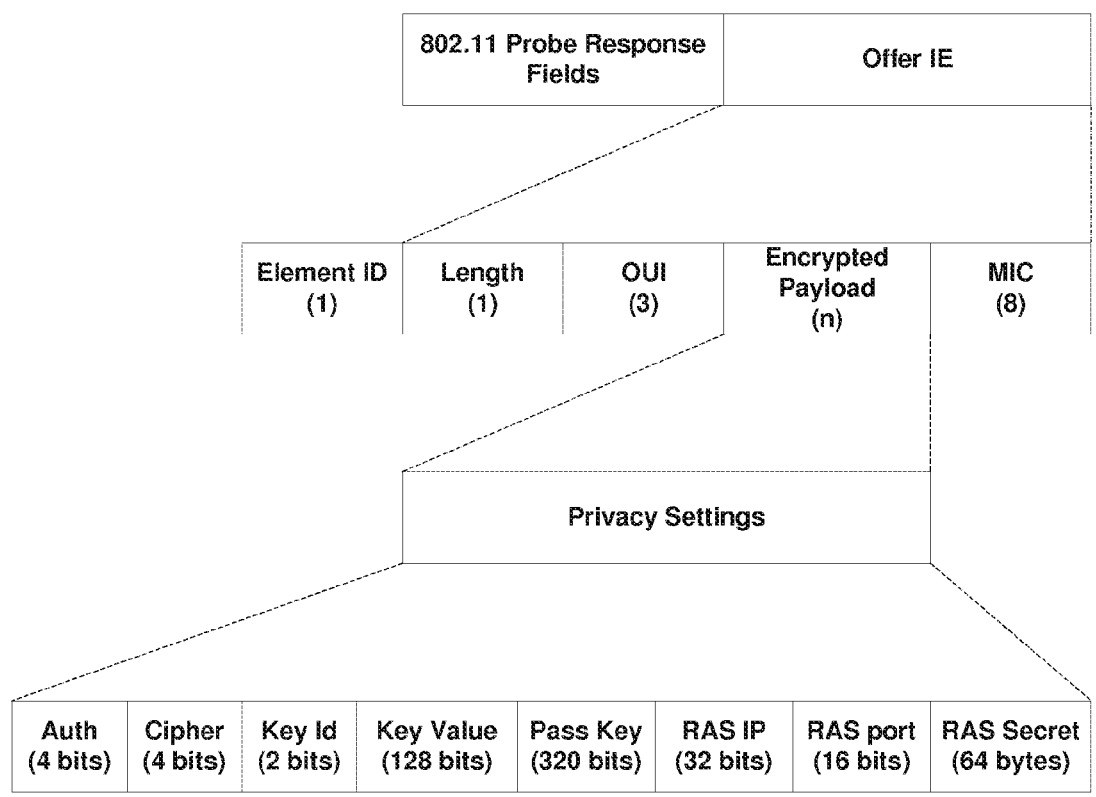
FIG. 8 is an exemplary probe response frame format.

For an embodiment utilizing IEEE 802.11, element ID's 7-15 and 32-255 are reserved for vendors to implement proprietary features. For one embodiment, element ID 7 is utilized for the beacon, element ID 8 is utilized for probe request, and element ID is utilized for the probe response. Alternatively, various other arrangements of the beacon, probe request, and probe response within the proprietary element ID's are utilized. For one embodiment, an Organizationally Unique Identifier ("OUI") or other unique identifier is included in the information elements to distinguish each of the wireless access points from others. FIGS. 6-8 illustrate exemplary formats for each of these three elements.

FIG. 6 is an exemplary format of an beacon frame as described above with reference to block 505 of FIG. 5. The advertisement is concatenated to the regular 802.11 beacon field(s). The advertisement parameters include element ID (1 byte), Length (1 byte) to indicate the length of total advertisement, OUI (3 bytes) to specify vendor ID, and a payload field. The payload includes fields for protocol, software, and/or hardware version (1 byte), hop count (1 byte), nonce (4 bytes), number of wireless stations already in the BSS ("Client Count") (1 byte), mean RSSI (1 byte) and the wireless root access point's public key (48 bytes).

FIG. 7 is an exemplary format of a probe request frame as described above with reference to block 515 of FIG. 5. The discovery is concatenated to the regular 802.11 probe request field(s). The discovery parameters include element ID (1 byte), Length (1 byte) to indicate the length of total discovery, OUI (3 bytes) to specify vendor ID, and an encrypted payload field. The payload includes fields for protocol, software, and/or hardware version (1 byte), configuration checksum (4 bytes), nonce (4 bytes), the wireless extender's public key (48 bytes), and the secret key K (48 bytes).

FIG. 8 is an exemplary format of a probe response frame as described above with reference to block 525 of FIG. 5. The offer is concatenated to the regular 802.11 probe response field(s). The offer parameters include Element ID (1 byte), Length (1 byte) to indicate the length of total offer, OUI (3 bytes) to specify vendor ID, an encrypted payload field, and a MIC (8 bytes). The payload includes a privacy settings field, which includes fields for authentication (e.g., open, shared, both, WPA-PSK, WPA-EAP) (4 bits), cipher (e.g., WEP, TKIP, AES) (4 bits), WEP key index (2 bits), active WEP key value (128 bits), WPA pass key (320 bits), Remote Authentication Dial In User Service ("RADIUS") server IP address (32 bits), RADIUS server port (16 bits) and RADIUS server secret (64 bytes).

In the foregoing specification, the invention has been described with reference to specific exemplary embodiments thereof. It will be evident that various modifications may be made thereto without departing from the broader spirit and scope of the invention as set forth in the following claims. For example, different byte lengths and ordering of the frame formats described above can be implemented. Additionally, while the description above is focused on secure discovery and provisioning among access points, embodiments of the secure discovery and provisioning described herein applies to discovery and provisioning of a secure connection between other wireless devices as well.

An article of manufacture may be used to store program code providing at least some of the functionality of the embodiments described above. An article of manufacture that stores program code (i.e., a computer-readable storage medium or machine-readable storage medium) may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable storage media suitable for storing electronic instructions. A machine-readable storage medium, as used herein, refers to a tangible device and not to a carrier wave. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A method for connecting to a wireless access point, the method comprising:

receiving information from a wireless access point at an electronic device, wherein the received information includes radio information and one or more privacy settings relating to a secure wireless connection between the wireless access point and the electronic device;

tuning a radio at the electronic device based on the radio information received from the wireless access point;

setting at least one of the privacy settings at the electronic device based on the one or more privacy settings received from the wireless access point, wherein the at least one privacy setting is set automatically without requiring user input at the electronic device; and performing an authentication process based at least in part on the at least one privacy setting.

2. The method of claim 1, further comprising receiving a communication from a wireless station, and forwarding the received communication to the wireless access point, wherein connecting the wireless access point to the wireless station based on the forwarded communication extends a wireless range of the wireless access point.

3. The method of claim 2, further comprising sharing the at least one privacy setting with the wireless station, and allowing the wireless station to roam between the wireless access point and the electronic device without changing the at least one privacy setting.

4. The method of claim 1, wherein the at least one privacy setting is encrypted.

5. The method of claim 1, wherein the wireless access point is a root access point.

6. The method of claim 1, wherein at least one communication received from the wireless access point is encrypted and decrypted using public-private key pairs.

7. A non-transitory computer readable storage medium having embodied thereon a program executable by processor to perform a method for connecting to a wireless access point, the method comprising:

receiving information from a wireless access point at an electronic device, wherein the received information includes radio information and one or more privacy settings relating to a secure wireless connection between the wireless access point and the electronic device;

tuning a radio at the electronic device based on the radio information received from the wireless access point;

setting at least one of the privacy settings at the electronic device based on the one or more privacy settings received from the wireless access point, wherein the at least one privacy setting is set automatically without requiring user input at the electronic device; and performing an authentication process based at least in part on the at least one privacy setting.

8. The non-transitory computer readable storage medium of claim 7, wherein the program further comprises instructions executable to perform an authentication process based at least in part on the at least one received privacy setting.

9. The non-transitory computer readable storage medium of claim 7, wherein the program further comprises instructions executable to receive a communication from a wireless station, and to forward the received communication to the wireless access point, wherein connecting the wireless access point to the wireless station based on the forwarded communication extends a wireless range of the wireless access point.

10. The non-transitory computer readable storage medium of claim 9, wherein the program further comprises instructions executable to share the at least one privacy setting with the wireless station, and wherein the wireless station is allowed to roam between the wireless access point and the electronic device without changing the at least one privacy setting.

11. The non-transitory computer readable storage medium of claim 7, wherein the at least one privacy setting is encrypted.

12. The non-transitory computer readable storage medium of claim 7, wherein the wireless access point is a root access point.

13. The non-transitory computer readable storage medium of claim 7, wherein at least one communication received from the wireless access point is encrypted and decrypted via public-private key pairs.

14. An apparatus for connecting to a wireless access point, the apparatus comprising:
    a network interface that receives information from a wireless access point, wherein the received information includes radio information and one or more privacy settings relating to a secure wireless connection with the wireless access point;
    a radio that is tuned based on the radio information received from the wireless access point; and
    a processor that executes instructions stored in memory, wherein execution of the instructions by the processor sets at least one of the privacy settings at the electronic device based on the one or more privacy settings received from the wireless access point, wherein the at least one privacy setting is set automatically without requiring user input at the electronic device.

15. The apparatus of claim 14, wherein the processor executes further instructions to perform an authentication process based at least in part on the at least one received privacy setting.

16. The apparatus of claim 14, wherein the network interface receives a communication from a wireless station, and forwards the received communication to the wireless access point, wherein connecting the wireless access point to the wireless station based on the forwarded communication extends a wireless range of the wireless access point.

17. The apparatus of claim 16, wherein the network interface shares the at least one privacy setting with the wireless station, and wherein the wireless station is allowed to roam between the wireless access point and the electronic device without changing the at least one privacy setting.

18. The apparatus of claim 14, wherein the at least one privacy setting is encrypted.

19. The apparatus of claim 14, wherein at least one communication received from the wireless access point is encrypted and decrypted via public-private key pairs.

* * * * *